United States Patent [19]

Rylander

[11] 4,240,675

[45] Dec. 23, 1980

[54] STUFFING GLAND

[76] Inventor: Nicholas M. Rylander, 811 Beacon Bldg., Tulsa, Okla. 74103

[21] Appl. No.: 953,461

[22] Filed: Oct. 23, 1978

[51] Int. Cl.³ .................... F16C 19/10; F16C 39/04
[52] U.S. Cl. ........................................ 308/9; 308/161
[58] Field of Search ............. 308/9, 160, 161, DIG. 1

[56] References Cited

U.S. PATENT DOCUMENTS

| | | | |
|---|---|---|---|
| 1,122,051 | 12/1914 | Wohlenberg | 308/9 |
| 1,903,210 | 3/1933 | Carrier | 308/9 |
| 2,605,147 | 7/1952 | Raichle et al. | 308/9 |
| 3,854,781 | 12/1974 | Bildtsen | 308/9 |
| 3,913,989 | 10/1975 | Williams | 308/9 |

Primary Examiner—Richard R. Stearns
Attorney, Agent, or Firm—Head & Johnson

[57] ABSTRACT

A stuffing gland for shafts subject to relatively high pressures and comprising a collar disposed around the outer periphery of the stem and having one side thereof open to the high pressure acting on the stem, a passageway communicating the high pressure from the one side of the collar to the opposite side thereof for applying an equal and opposite force against the collar for equalization of the pressures acting on the shaft whereby the shaft may be freely rotated about its own longitudinal axis.

9 Claims, 2 Drawing Figures

STUFFING GLAND

BACKGROUND OF THE INVENTION

1. Field of the Invention

This invention relates to improvements in stuffing glands and more particularly, but not by way of limitation, to a pressure balancing stuffing gland for shafts subjected to relatively high pressures.

2. Description of the Prior Art

In any pressure vessel having a shaft or stem protruding therefrom through a single opening, such as a gate valve stem, or the like, the shaft is urged axially outwardly from the vessel by a force in pounds equal to the projected area of the largest sealed diameter of the shaft (expressed in square inches) multiplied by the internal pressure in pounds per square inch, commonly known as psi. The pressure thus acting on the shaft causes difficulties in operation of the shaft, particularly when the internal pressure in the vessel or valve is relatively high. The force urging the shaft axially outwardly must be overcome in some manner in order to activate the shaft, such as to rotate the shaft about its longitudinal axis, as in order to open or close a gate valve. For example, a one inch diameter shaft extending or protruding from a vessel having an internal pressure of one thousand psi is urged outwardly by a force of seven hundred eight pounds. A two inch diameter shaft subjected to the same pressure conditions is pushed by a force equal to 3,142 pounds. It will be readily apparent that powerful operators and/or high quality bearings must be utilized for overcoming these forces in order to actuate the shaft.

SUMMARY OF THE INVENTION

The present invention contemplates a novel stuffing gland particularly designed and constructed for balancing the forces acting on a shaft for overcoming the foregoing disadvantages. The stuffing gland comprises a collar disposed around the outer periphery of the shaft and having one end thereof open to the internal high pressure acting on the shaft. This high pressure is directed to the opposite end of the collar for balancing or equalizing the forces acting on the collar. This high pressure is also directed or cummunicated to the shaft in a manner for opposing the internal pressure acting on the shaft, thus equalizing the forces on the shaft and greatly reducing the force required for actuation of the shaft. The novel stuffing gland is simple and efficient in operation and economical and durable in construction.

BRIEF DESCRIPTION OF THE DRAWINGS

FIG. 1 is a sectional elevational view of a stuffing gland embodying the invention and illustrated in position around the protruding end of a shaft associated with a pressure vessel, valve, or the like.

DESCRIPTION OF THE PREFERRED EMBODIMENT

Figure 1:
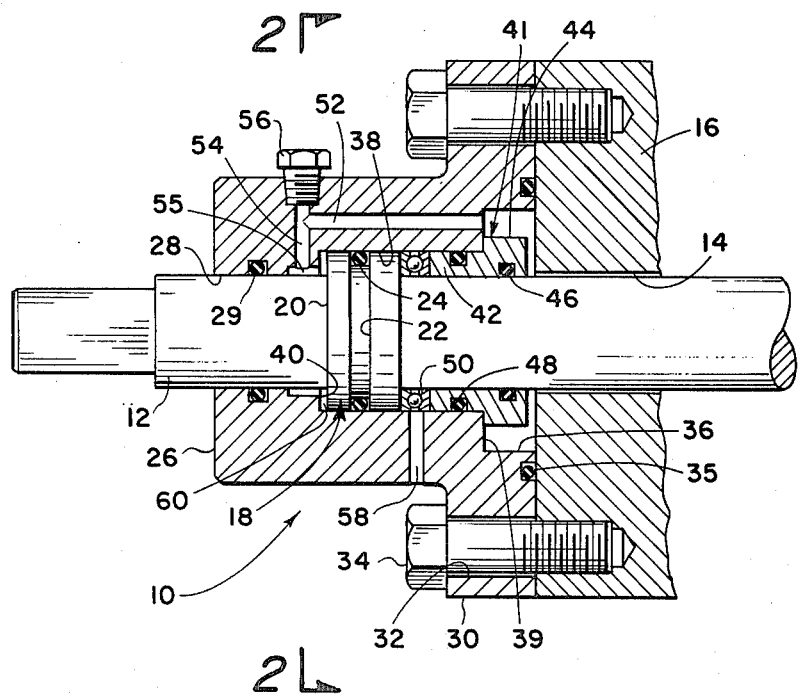
Figure 2:
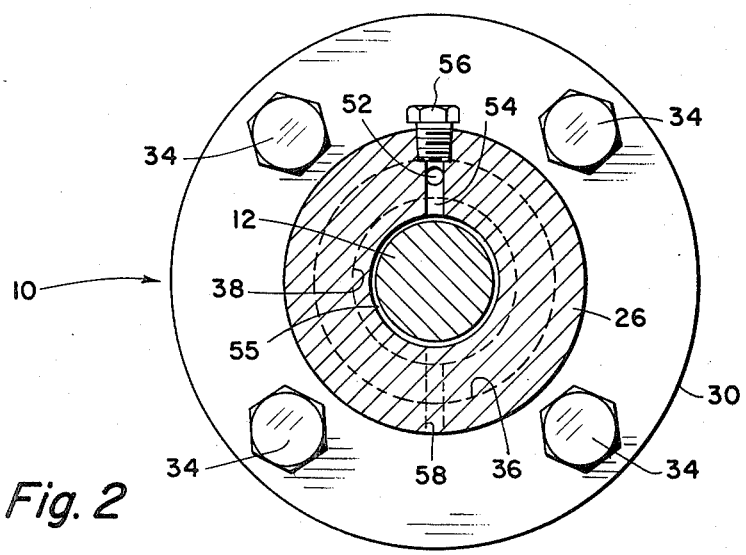
FIG. 2 is a sectional view taken on line 2—2 of FIG. 1.

Referring to the drawings in detail, reference numeral 10 generally indicates a stuffing gland embodying the invention and adapted for installation around the outer end of a shaft 12 projecting outwardly through an aperture 14 in the sidewall 16 of a vessel, valve body, or the like. The shaft 12 is normally loosely disposed in the bore 14 in order to reduce resistance to actuation of the shaft. A sleeve 18 is provided around the outer periphery of the shaft 12 spaced axially outwardly from the outer surface of the wall 16 and may be integral with the shaft 12, or a separate element rigidly secured thereto in any suitable manner, as desired. The sleeve 18 is of an outer diameter greater than the outer diameter of the shaft 12 and in proper ratio with respect thereto whereby the cross-sectional area of the sleeve 18 is equal to twice the cross-sectional area of the shaft 12. In other words, the cross-sectional area $A_1$ of the sleeve 18 is in proper ratio to the cross-sectional area $A_2$ of the shaft 12 whereby $A_1 - A_2 = A_2$. Thus, the area of the end 20 of the sleeve 18 equals the cross-sectional area of the shaft 12. In addition, an annular groove 22 is provided in the outer periphery of the sleeve 18 for receiving a suitable sealing member, such as an O-ring 24, therein for a purpose as will be hereinafter set forth.

The stuffing gland 10 comprises a substantially cylindrical outer housing 26 adapted for disposition around the outer end of the shaft 12 and sleeve 18 and having an aperture 28 provided in one end thereof for receiving the shaft 12 therethrough as particularly shown in FIG. 1. A suitable sealing member 29 is interposed between the bore 28 and the outer periphery of the shaft 12 for precluding leakage of fluid therebetween. An outwardly extending circumferential flange 30 is provided at the opposite end of the housing 26 and is provided with a plurality of circumferentially spaced bores 32 for receiving bolts 34 or the like therethrough for securing the housing 26 to the outer surface of the wall 16. A suitable sealing ring 35 is interposed between the flange 30 and the wall 16 for sealing therebetween. A substantially centrally disposed bore 36 is provided in the housing 26 and open to the outer surface of the wall for receiving the internal pressure of the vessel or valve through the bore 14 since there is normally no sealing between the shaft 12 and the bore 14. The bore 36 is of a reduced diameter at 38 to provide an annular shoulder 39 and is in sealing engagement with the sealing ring 24 for precluding leakage of fluid therebetween. The bottom 40 of the bore 38 is spaced slightly from the end 20 of the sleeve 18 for a purpose as will be hereinafter set forth.

A substantially cylindrical collar 41 is disposed around the outer periphery of the shaft 12 and within the housing 26. The collar 41 comprises a stem portion 42 having the inner periphery thereof in engagement with the outer periphery of the shaft 12 and the outer periphery thereof in engagement with the inner periphery of the bore 38. An outwardly extending circumferential flange 44 is provided on the outer end of the stem 42 for engagement with the shoulder 39 for limiting the movement of the collar 41 in one direction. A suitable sealing member 46 is interposed between the collar 41 and the shaft 12 for precluding leakage of fluid therebetween, and a similar sealing member 48 is interposed between the collar 41 and the bore 38 for precluding leakage of fluid therebetween. In addition, a suitable bearing or thrust washer 50 is disposed around the shaft 12 and interposed between the sleeve 18 and collar 41 for a purpose as will be hereinafter set forth.

A longitudinally extending passageway 52 is provided in the housing 26 and extends from the bore 36 into communication with a radially extending bore 54. The bore 54 extends into communication with an annular chamber 55 interposed between the bore 18 and bottom 40 of the bore 36 and surrounding the shaft 12, as particularly shown in FIG. 1. The outer end of the bore 54 is open to the exterior of the housing 26 and is provided with an enlarged threaded portion for receiving a suitable pipe plug 56 therein for sealing thereof, as is well known. In addition, a radial bore 58 is provided in the housing 26 in the proximity of the bearing 50 and extends between the bore 38 and the exterior of the housing 26 for venting of the bore 38 to the atmosphere, as will be hereinafter set forth.

In operation, the high pressure within the vessel or valve associated with the wall 16 is communicated to the bore 36 through the bore 14 which surrounds the shaft 12, and the pressure acts against the outer end of the collar 41 for urging the collar in a left hand direction as viewed in FIG. 1. The left hand movement of the collar 41 is limited by the engagement of the flange 44 with the shoulder 39. The pressure in the bore 36 cannot pass around the collar 41 due to the sealing members 46 and 48, and thus is communicated through the passageway 52 and bore 54 to the chamber 55 and to the left hand side of the sleeve 18 for acting on the end 20 thereof. The pressure is maintained between the seals 29 and 24, and the area between the collar 41 and sleeve 18 is isolated from the fluid pressure, and the port 58 bleeds any pressure therein to the atmosphere.

Since the area of the end 20 exposed to the high pressure is equal to the cross-sectional area of the shaft 12 exposed to the same high pressure present internally in the vessel, the pressure outboard of the end 20 pushes on the sleeve 18 in the direction of the wall 16 with an equal force that is exerted on the shaft in the outboard direction. The forces acting on the shaft being thus equalized, the shaft is pressure balanced, and actuation of the shaft is considerably facilitated.

From the foregoing it will be apparent that the present invention provides a novel stuffing gland for use with the projecting end of a shaft utilized in a high pressure vessel, valve, or the like, and which is particularly designed for equalizing the pressures acting on the shaft for facilitating actuation of the shaft. The stuffing gland comprises a collar member having one end open to the high pressure acting on the shaft, and the opposite end thereof having an equal and opposite force acting thereon. The internal high pressures acting on the shaft are by-passed around the collar whereby the shaft is pressure balanced, and the actuation thereof, such as rotation of the shaft about its own longitudinal axis, is greatly facilitated since there is relatively little pressure to be overcome by the actuator means.

Whereas the present invention has been described in particular relation to the drawings attached hereto, it should be understood that other and further modifications, apart from those shown or suggested herein may be made within the spirit and scope of this invention.

What is claimed is:

1. A stuffing gland for a shaft subjected to relatively high pressures and comprising housing means secured around the outer periphery of the shaft, outwardly extending circumferential shoulder means provided on the outer periphery of the shaft and disposed within the housing means, passageway means provided in the housing means for communicating the pressure acting on the shaft to the outboard face of the circumferential shoulder means, collar means loosely disposed around the outer periphery of the shaft and disposed within the housing means and having one end thereof open to the pressure acting on the shaft, bearing means interposed between the collar means and the circumferential shoulder means for transmitting pressure to the inboard face of the circumferential shoulder means, the cross sectional area of the circumferential shoulder means being in selected ratio with the cross sectional area of the shaft whereby pressures acting on the outboard side of the circumferential shoulder means when the movement of the collar means is limited by the housing means are equal and opposite to the pressures acting on the shaft for equalizing the forces acting on the shaft.

2. A stuffing gland as set forth in claim 1 wherein the cross sectional area of the shoulder means is $A_1$ and the cross sectional area of the shaft is $A_2$, and wherein $A_1 - A_2 = A_2$.

3. A stuffing gland as set forth in claim 1 and including vent port means provided through the sidewall of the housing means and in the proximity of the bearing means for venting pressure fluid from the interior of the housing means to the atmosphere.

4. A stuffing gland as set forth in claim 1 wherein said housing means comprises a substantially cylindrical body having an outwardly extending circumferential flange provided at one end thereof for removable installation of said stuffing gland around said shaft, inwardly directed annular shoulder means provided at the opposite end of the body for receiving one end of the shaft therethrough, centrally disposed recess means provided in the body conterminous with the circumferential flange for providing a pressure chamber around the outer periphery of the shaft, said collar means being engagable with the bottom of the central recess for limiting the movement of the collar means in one direction with respect to the housing means and said one end of the collar means being open to the pressure within the pressure chamber.

5. A stuffing gland as set forth in claim 4 wherein the passageway means extends between the pressure chamber and the outboard face of the circumferential shoulder means.

6. A stuffing gland as set forth in claim 5 and including annular chamber means provided in the body means in the proximity of the outboard face of the circumferential shoulder means and in communication with the passageway means whereby the pressure in the pressure chamber is transmitted to the annular chamber.

7. A stuffing gland as set forth in claim 1 and including first seal means interposed between the collar means and the shaft for precluding leakage of fluid therebetween, and second seal means interposed between the housing means and the shaft for precluding leakage of fluid therebetween.

8. In combination with a pressure vessel having a shaft extending outwardly through a sidewall thereof and open to the internal pressure of the vessel, a stuffing gland disposed around the outer periphery of the shaft and secured to the sidewall of the vessel and comprising substantially cylindrical housing means receiving the outwardly extending shaft therethrough, sealing means interposed between the housing means and the shaft for precluding leakage of fluid therebetween, and internal pressure chamber provided in the housing means around the outer periphery of the shaft and in communication with the internal pressure of the vessel, outwardly extending annular shoulder means provided on the outer periphery of the shaft and disposed within the housing means in spaced relation with respect to the pressure chamber whereby the pressure chamber is inboard of the shoulder means, an annular chamber provided in the housing means in communication with the outboard side of the shoulder means, passageway means provided in the housing means providing communication between the pressure chamber and the annular chamber for equalizing the pressure therebetween, collar means disposed around the outer periphery of the shaft and disposed within the housing means and having one end thereof open to the pressure within the pressure chamber, bearing means interposed between the collar means and the annular shoulder means and cooperating therebetween to preclude movement of the collar means in an outboard direction, the cross sectional area of the annular shoulder means being of a ratio with respect to the cross sectional area of the shaft whereby the pressures acting on the shaft when the movement of the collar means is precluded in said outboard direction are equalized for facilitating operation of the shaft under high pressure conditions within the vessel.

9. In combination with a pressure vessel having a shaft extending outwardly through a sidewall thereof and open to the internal pressure of the vessel, a stuffing gland as set forth in claim 8 wherein the cross sectional area of the annular shoulder means is $A_1$ and the cross sectional area of the shaft is $A_2$, and wherein $A_1 - A_2 = A_2$.

* * * * *